May 5, 1942.　　F. C. WOELFER, JR　　2,281,737
DISCHARGE NOZZLE
Filed April 30, 1940

INVENTOR.
BY Frank C. Woelfer Jr.
Wood & Wood ATTORNEYS

Patented May 5, 1942

2,281,737

UNITED STATES PATENT OFFICE 2,281,737

DISCHARGE NOZZLE

Frank C. Woelfer, Jr., Cincinnati, Ohio, assignor to The Cincinnati Ball Crank Company, Cincinnati, Ohio, a corporation of Ohio Application April 30, 1940, Serial No. 332,576

3 Claims. (Cl. 221—47.3)

This invention relates to nozzles for controlling the flow of grease or other fluid substance to a point of use. More particularly the invention relates to improvements in the valve usually included in the nozzle. Those nozzles are adapted for use at the end of a hose line or delivery conduit for controlling the supply of a fluid, such as grease, which is delivered under high pressure.

In a nozzle of this type, it is important that the valve operation be extremely sensitive and that it be possible to open and close the valve in rapid succession. Due to the fact that the grease is coming through the line under high pressure a great deal of grease can pass a given point in a very short time. In order to make the valve operation sensitive, it is requisite that an adjusting means be included which may be easily actuated and set to fine variations.

It has been the object of the present inventor to provide a nozzle including a control valve which may be opened and then closed almost immediately so that in the intervening fraction of time a controlled short or volume of grease may be discharged. One embodiment of the invention for making this possible may consist of a passage including opposed seats closely spaced with the valve movable from one seat to another. Fine adjustment is requisite since a slight variation of the spacing of the seats brings about a considerable change in volume. Therefore it has been another object here to provide a means for varying the spacing of the seats with very little trouble.

It has been a further object of the inventor to provide an operating mechanism for the valve which mechanism is compact and readily adapted for combination with the valve and the opposed seats.

Other objects and certain advantages will be more fully apparent from a description of the drawing in which.

Figure 1:
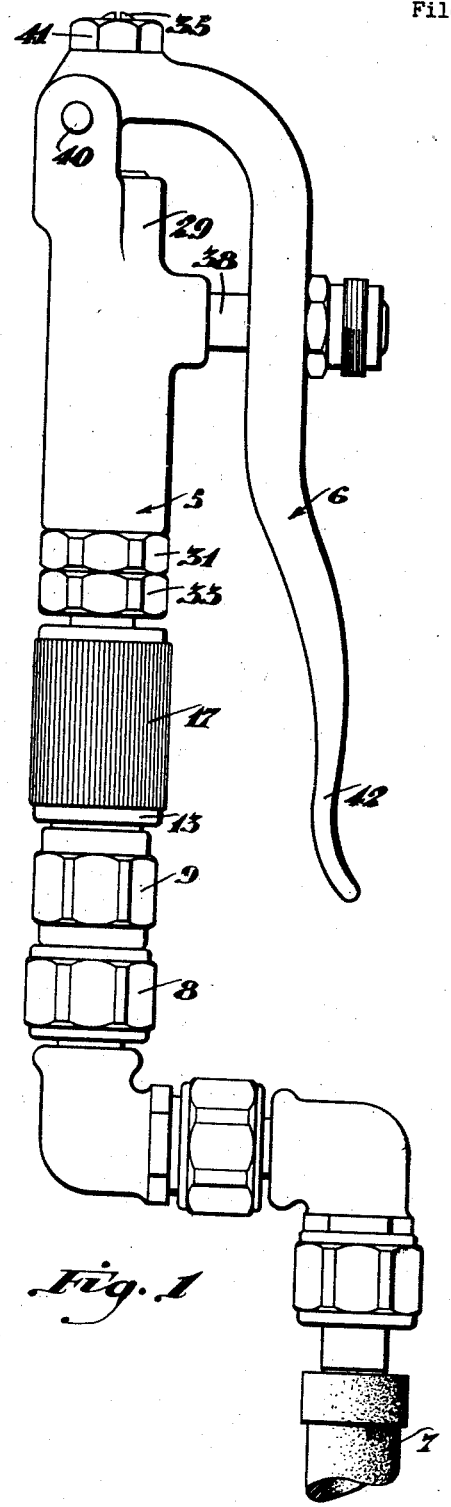
Figure 1 is an external view of the improved nozzle.
Figure 2:
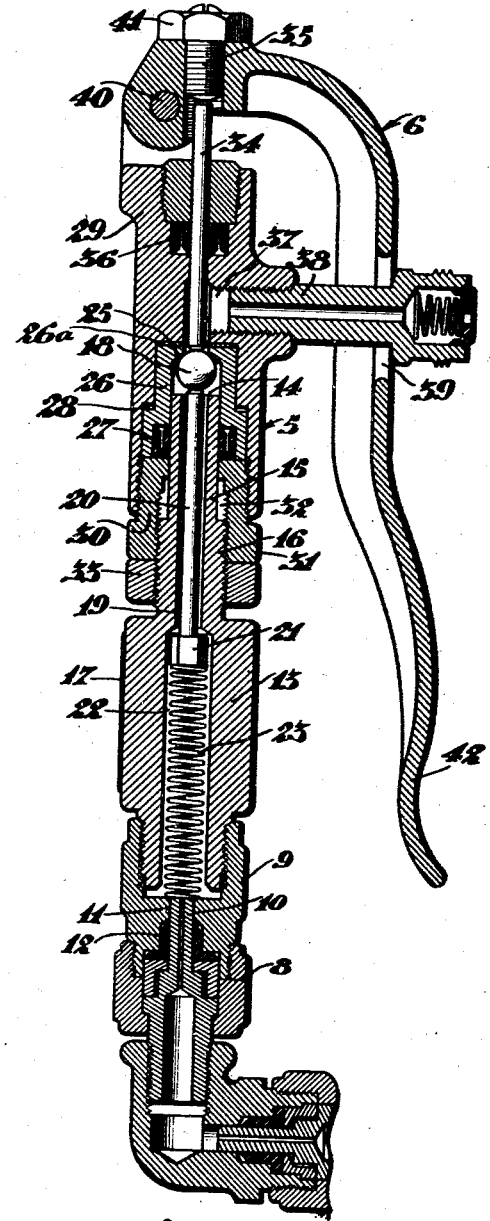
Figure 2 is a sectional view taken longitudinally of the device showing all of the internal parts.

Referring to the drawing, the control apparatus is generally indicated at 5 and its operating handle at 6. It is not believed necessary to describe the fittings which flexibly couple the hose line 7 to the control device. One of these fittings includes the coupling sleeve 8 into which the extension 9 is screwed. The nipple 10, extending from the coupling, projects into the bore 11 of the extension 9 and a gasket 12 seals the joint between the nipple and the extension.

The sleeve 9 carries an elongated tubular element 13 the outer end of which constitutes a valve seat 14. The outer end portion of this element 13 is of reduced diameter providing specifically a plain portion 15, and an enlarged screw threaded portion 16. The attached end of the element 13 is screwed into the extension 9. The body of the element is knurled as at 17 so that it may be conveniently held for adjusting purposes. Means for seating the bell valve 18 is contained in the bore 19 of the element 13. A stem or plunger 20 is disposed loosely in the reduced bore 19 at the outer end of the element 13. The head 21 of this plunger is disposed in an enlarged bore portion 22 and is engaged by a coil spring 23 under compression between the head 21 and the base of the bore of the extension 9 into which the element 13 is screwed.

The other valve seat indicated at 25 is provided in a tubular element 26 fitted over the plain end of the element 13 and sealed with respect thereto by means of a gasket 27. This seat element 26 is held between the inner end of the bore 28 in a lever support element 29 and the outer face of a plug 30 screw threaded into the outer end of the bore 28. The plug includes a nut portion 31. A copper sealing gasket disc 26a is placed between the element 26 and the inner end of the bore in which the element fits.

The screw threaded portion of the element 13 is adjustably engaged into the screw threaded inner bore 32 of the plug 30 and thus the spacing of the valve seats 14, 25 may be varied by moving the elements 13 and 29 axially relatively. A locking nut 33 is provided on the screw threaded portion of the element 13 and is engaged against the plug when the seats 14, 25 are properly spaced.

Normally the ball valve 18 is held against the outermost seat by means of the plunger 21. A valve actuating shuttle pin 34 is disposed in the bore of the element 29 beyond the valve 18. Its inner end engages the ball valve and its outer end engages the adjustment screw 35 of the operating lever 6. A packing gland 36 seals the joint between the pin and the element 29. The grease passageway precedes laterally from an enlarged bore portion 37 in the element 29 through a nipple 38 disposed through a slot 39 in the lever 6. The lever 6 is pivoted on the element 29 on a pin 40 within the bifurcated end of the element 29. The adjustment screw 35 is set in position normally where it permits the valve to seat a lock nut 41 and holds it in position.

Now when the operator presses the longitudinally extended portion 42 of the handle 6 toward the body, the shuttle pin unseats the valve from the seat 25 and seats it against the seat 14. During the time it takes to move the valve from one seat to the other, grease passes through the passage to the point of use. If the valve is held at midway position, a constant flow results.

Due to the high pressure at which the grease is put through the line, a shot of grease is procured by moving the handle quickly. No matter how rapidly the handle is moved grease will be discharged. Therefore control of the volume is through variation of the spacing of the seats. This spacing can be minutely adjusted by screwing the element 13 into and out of the bushing or plug 30 and fixing it at the appropriate position.

Having described my invention, I claim:

1. A discharge nozzle for use at the end of a hose line, comprising; a tubular element having a screw threaded extension and a plain extension beyond the screw threaded extension, the forward end of the plain portion providing a valve seat, a tubular element screwed on said screw threaded extension, a separate valve seat element fixed in said last named element and providing a seat facing the first named seat, a lock nut on a screw threaded portion of the first element for locking the elements in fixed position with the valve seats spaced appropriately, a ball valve held against one seat, leverage means pivoted on the second element, and, a shuttle pin engaging the ball valve and actuated by the lever for moving the ball valve from its normal seat to the other seat.

2. A discharge nozzle for use at the end of a hose line, comprising; a tubular element having a screw threaded extension, the forward end of the extension providing a valve seat, a tubular element screwed on said screw threaded extension, a seat in said last named element facing the first named seat, means for locking the elements in fixed position with the valve seats spaced appropriately, a ball valve disposed between said seats, a spring pressed pin loosely disposed in the passageway in the first named element normally holding the valve against one seat, leverage means pivoted on said last named element, and a shuttle pin engaging the ball valve and actuated by the lever for moving the ball valve from its normal seat to the other seat.

3. A discharge nozzle adapted to be used in a hose line, comprising a tubular element having an extension thereon, the portion adjoining the body of the tubular element being screw-threaded and the outer portion being plain, a second tubular element, a valve seat element disposed in said second tubular element, a screw-threaded plug engaged in the second tubular element for holding the valve seat element in position therein, said screw-threaded plug screw-threaded upon the screw-threaded portion of the first tubular element, the plain portion of the first tubular element extended into the valve seat element, the outer end of the plain portion constituting a valve seat, said valve seat element providing a valve seat disposed adjacent and spaced from said first-named valve seat, a valve disposed loosely between said seats within the valve seat element, a pin disposed loosely in the bore of the first tubular element, said pin spring-urged for holding the valve against the seat of the valve seat element, a shuttle pin disposed in the second tubular element in engagement with the valve, a lever for actuating said shuttle pin for moving the valve from the valve seat of the valve seat element to position against the end of the plain portion, and a lock nut disposed on the screw-threaded portion of the first tubular element for locking, in adjusted position on the screw-threaded portion of the first tubular element, the assembly constituted by the second tubular element, the plug, and the valve seat elements.

FRANK C. WOELFER, Jr.